United States Patent [19]

Ulam

[11] 4,347,722
[45] Sep. 7, 1982

[54] METHOD OF MAKING A COOKING VESSEL WHICH HAS SURFACE ORNAMENTATION

[76] Inventor: John B. Ulam, 134 Mt. Blaine Dr., McMurray, Pa. 15317

[21] Appl. No.: 150,822

[22] Filed: May 19, 1980

[51] Int. Cl.³ .............................................. B21D 51/22
[52] U.S. Cl. ........................................ 72/63; 72/197; 72/379
[58] Field of Search ....... 113/120 CC, 120 W, 116 Z; 72/185, 197, 63, 379

[56] References Cited

U.S. PATENT DOCUMENTS

| | | | |
|---|---|---|---|
| 319,306 | 6/1885 | Palmer | 113/116 Z |
| 1,717,482 | 6/1929 | Weidlich et al. | 113/116 Z |
| 1,856,898 | 5/1932 | Wood | 72/197 |
| 2,171,040 | 8/1939 | Merritt et al. | 113/120 CC |
| 2,269,627 | 1/1942 | Hellberg | 113/120 CC |
| 2,325,659 | 8/1943 | Chace | 113/120 CC |
| 3,670,546 | 6/1972 | DeLaSierra | 72/63 |
| 3,962,895 | 6/1976 | Rydell | 72/63 |
| 4,192,166 | 3/1980 | Johnson | 113/116 Z |

*Primary Examiner*—Lowell A. Larson
*Attorney, Agent, or Firm*—Beveridge, DeGrandi & Kline

[57] ABSTRACT

A metal sheet is deformed to produce a blank which has one side which is smooth and another side which is ornamented with a pattern of raised and/or depressed areas. The blank is deformed to produce a cooking vessel which has the ornamented side located on its exterior surface.

6 Claims, 5 Drawing Figures

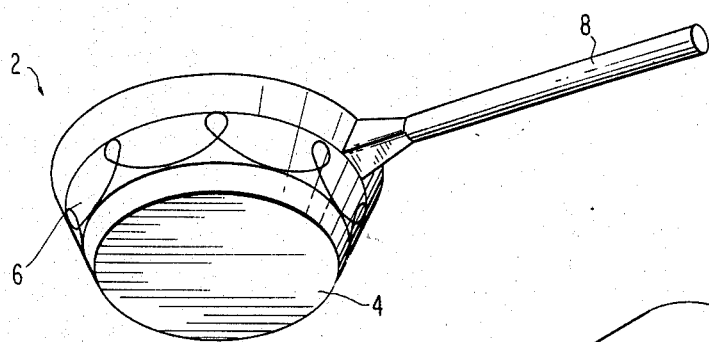
FIG 1
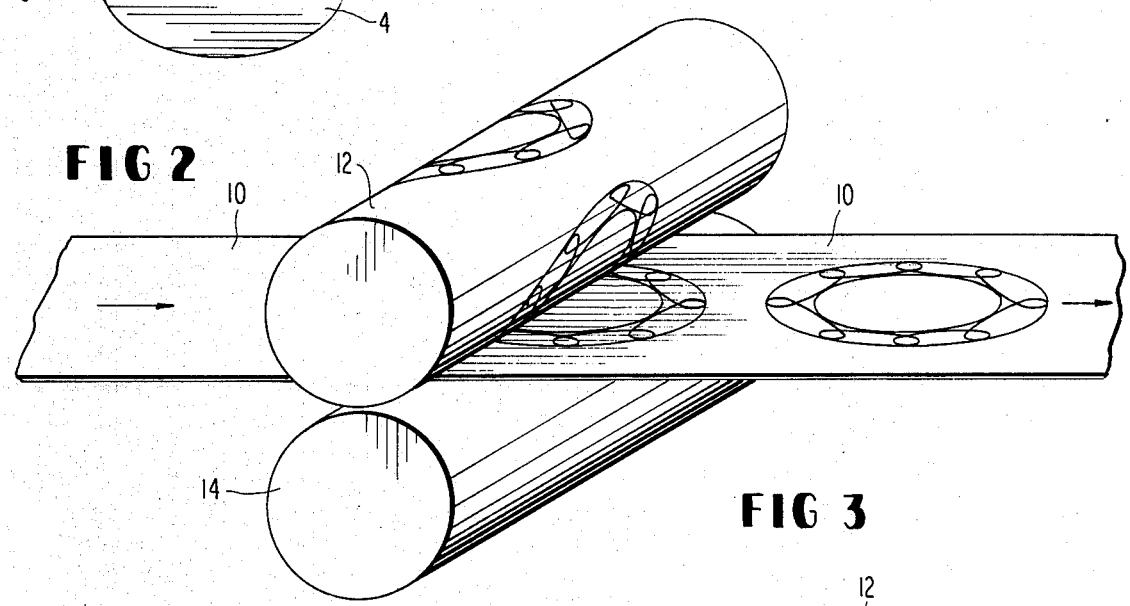
FIG 2
FIG 3
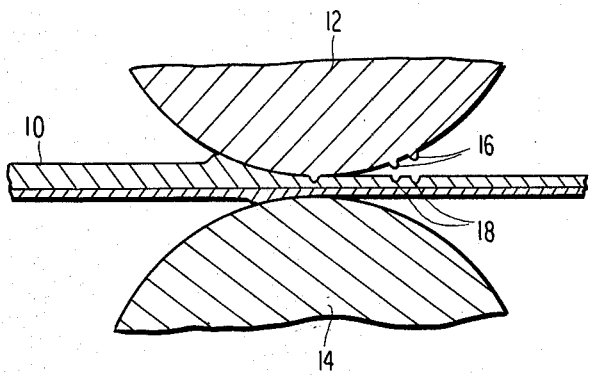
FIG 4
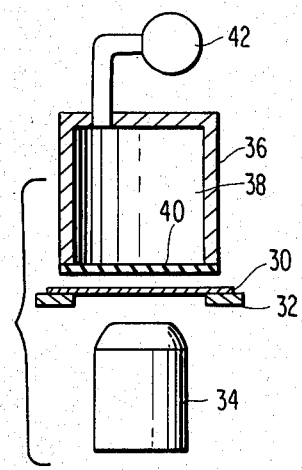
FIG 5
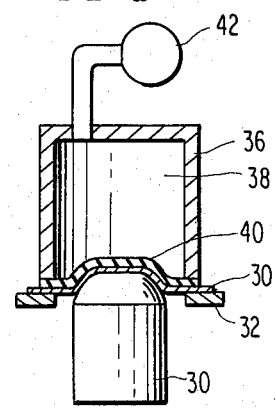

METHOD OF MAKING A COOKING VESSEL WHICH HAS SURFACE ORNAMENTATION

BACKGROUND OF THE INVENTION

This invention relates to a method of making a decorative cooking vessel which has surface ornamentation embossed on its external surface. The term "embossed" as used in this specification describes a surface which has raised areas and depressed areas. It covers patterns which are depressed and/or raised from the principal surface of the article, such raised patterns sometimes being referred to as a debossed design.

In modern kitchens, the cookware often serves both utilitarian and decorative functions. Decorative effects have been achieved by the use of metals which have an attractive natural color, by coloring the metals in an anodizing process or by coating the metals with enamel. Ornamental patterns may be placed on the exterior surfaces of cooking vessels by coating or etching techniques.

Many metallic items are formed by embossing processes but, to the knowledge of the present inventor, such techniques have not been used to provide an ornamental surface design on cookware vessels.

SUMMARY OF THE INVENTION

According to the present invention, a cooking vessel which has surface ornamentation is manufactured by deforming a metal sheet to produce a blank which has one side which has an ornamental pattern formed of raised or depressed areas. The opposite surface is preferably smooth. Subsequently, the blank is deformed into the configuration of a vessel which has interior and exterior surfaces. The deforming step is performed so that the smooth side of the blank is located on the interior surface of the vessel and the ornamented side of the blank is located on the external surface of the vessel.

Preferably, but not essentially, the step of deforming the blank to form a vessel is performed by engaging the smooth side of the blank with a forming die and exerting on the ornamented side of the blank a fluid pressure which is sufficient to cause the blank to conform to the surface of the die. Further, it is preferred to form the embossed blank by rolling the sheet in a rolling mill, reducing the maximum thickness of the sheet by contacting one side of the sheet with a smooth roll and contacting the other side of the sheet with a roll which has raised areas and depressed areas which form the ornamental pattern. These methods may be used to form a vessel which has a solid aluminum or copper construction, or a composite construction with a smooth stainless steel interior surface and an embossed exterior surface of aluminum or copper.

Although the invention may be performed in many ways, a preferred embodiment thereof is shown and described in the following drawings and descriptive text.

BRIEF DESCRIPTION OF THE DRAWINGS

FIG. 1 is a perspective view of a cooking vessel made according to the invention.

FIG. 2 is a diagramatic view showing the deformation of a metal sheet in a rolling mill to produce a blank which has a smooth side and an embossed ornamental side.

FIG. 3 is an enlarged view of the embossing step which occurs in the apparatus of FIG. 2.

FIGS. 4 and 5 show the structure and use of a hydraulic forming press for forming vessels from flat blanks.

BRIEF DESCRIPTION OF A PREFERRED EMBODIMENT

A cooking vessel 2 made according to the invention, shown in FIG. 1, includes a generally flat bottom wall 4, an upstanding sidewall 6 and a handle 8 attached to the sidewall. The exterior surface of the sidewall is ornamented with a decorative design formed of a recessed curlique line and two recessed circular lines.

According to the invention, a blank is made by embossing an ornamental pattern on one side of a metal sheet; and, deforming the blank to form a vessel, the exterior surface of which has the ornamental pattern previously embossed on the blank.

FIGS. 2 and 3 show the step of embossing the blank. In this operation, a sheet 10 of stock material, either from flat stock or a coil, is passed through a rolling mill which has an upper roll 12 and a lower roll 14. As shown in FIG. 3, the rolls 12 and 14 reduce the overall thickness of the sheet and provide the embossed design. The lower roll 14 is smooth, and the upper roll 12 is provided with a number of raised segments 16 which provide correspondingly-shaped depressed areas 18 in the upper surface of the sheet 10. The lower side of the sheet 10 is smooth. After being embossed, the sheet 10 may be cut and straightened as necessary to provide a flat blank suitable for subsequent processing. In some cases, it may be desirable to preheat the metal sheet so that its temperature will be elevated during the embossing step. The embossing roll 12 may be provided with depressions rather than raised areas, in which event the blank will be given a raised or debossed ornamental pattern. The thickness difference between the raised areas and the depressed areas may vary widely, suitably ranging from about 0.005 inch to about 0.030 inch.

The configuration of the embossed pattern may be geometric, alphanumeric or pictorial. The composite pattern may have the illustrated annular configuration where it will appear only on the sidewall of the cooking vessel. In lieu of or in addition to this, the center of the blank may be embossed to provide an ornamental pattern which will be on the exterior side of the bottom wall of the vessel.

The preferred method of forming the flat blank into a vessel is shown in FIGS. 4 and 5. This technique involves the application of fluid pressure to one side of the blank to deform the blank into conformity with the surface of a punch or forming die which lies in contact with the opposite side of the blank.

In FIG. 4, the flat embossed blank 30 is initially supported on a stationary draw ring 32, directly above and concentric with a punch 34, the upper portion of which has a shape conforming to the desired configuration of the interior surface of the cooking vessel. A housing 36 above the blank is provided with a pressure fluid chamber 38. The lower wall of this chamber 38 is formed by a stretchable flexible membrane 40. The chamber 38 is filled with hydraulic oil, and it is connected to a pressure source 42.

During normal operation of the press, the upper housing 36 is moved downwardly until the lower surface of the membrane 40 lies against the upper surface of the blank 30. Simultaneously, a hydraulic cylinder, not shown, move the punch 34 upwardly against the lower surface of the blank 30 and presses portions of the blank into the chamber 38 as shown in FIG. 5. The fluid in the upper chamber 38 is pressurized to exert a deformation force on the upper surface of the blank, causing the blank to conform without distortion to the configuration of the punch 34. The blank thus acquires the shape of a cooking vessel. The punch 34 is lowered, the upper housing 36 is raised, and the blank is removed from the apparatus for trimming, polishing, anodizing, handle attachment and other steps customarily used in cookware manufacturing processes. The final product is shown in FIG. 1.

Preferably, the sheet 10 is a composite metal sheet, which has stainless steel on its smooth interior side, and either aluminum or copper on its embossed exterior side. Other materials may be used. For example, the sheet may be solid aluminum or solid copper. The embossing step may be performed in conventional two-high or four-high rolling mills, modified only by substituting a patterned roll such as the roll 12 for an existing roll. Alternatively both rolls may be smooth, and the metal sheet may be passed through the rolling mill in face-to-face relation with a flat embossing plate with a design embossed on its surface. An apparatus and method of this latter type is disclosed in Chenevier U.S. Pat. No. 3,559,465 issued Aug. 17, 1971, which is incorporated herein by reference.

Two suitable presses for the vessel-shaping deformation step are made by Cincinnati Millicron and by SMG, a German manufacturer. The press shown in FIGS. 4 and 5 is similar to presses sold by Cincinnati Millicron under the trademark Hydroform. The SMG presses have an upper punch which moves downwardly against the workpiece and into a lower chamber filled with pressurized water. The SMG presses do not have a membrane, so the pressurized water comes into direct physical contact with the workpiece.

Persons familiar with the cookware manufacturing art will recognize that the invention may be practiced by a variety of processes and machines which differ from the preferred embodiments described above. Therefore, it is emphasized that the invention, rather than being limited to the disclosed embodiments, is embracing of variations thereof and modifications thereto which fall within the spirit of the following claims.

I claim:

1. A method of making a cooking vessel which has surface ornamentation, comprising the steps of:

deforming a metal sheet to produce a blank which has one side which has an ornamental pattern formed of areas which are raised or depressed from the principal surface of said one side, deforming the blank to form therefrom a vessel which has interior and exterior surfaces, said step of deforming the blank being performed by engaging one side of the blank with a forming die and exerting fluid pressure on the opposite side of the blank which has the ornamental pattern with raised or depressed areas, said fluid pressure being sufficient to cause said blank to deform by conforming to the surface of said forming die, said deforming step being performed so that the side of the blank which has the ornamental pattern is located on the exterior surface of the vessel.

2. The method of claim 1 wherein the step of deforming the metal sheet to produce a blank is performed by rolling the sheet in a rolling mill to reduce the maximum thickness of the sheet, said rolling of the sheet being performed by contacting one side of the sheet with a smooth roll and contacting the other side of the sheet with a roll which has raised areas and depressed areas which form the ornamental pattern.

3. The method of claim 2 wherein the metal sheet is a composite metal sheet which has an aluminum face and a stainless steel face, said step of deforming the sheet to produce a blank being performed to provide the ornamental pattern on the side which has the aluminum face.

4. The method of claim 2 wherein the metal sheet is a composite metal sheet which has a copper face and a stainless steel face, said step of deforming the sheet to produce a blank being performed to provide the ornamental pattern on the side which has the copper face.

5. The method of claim 1 wherein the metal sheet is a composite metal sheet which has an aluminum face and a stainless steel face, said step of deforming the sheet to produce a blank being performed to provide the ornamental pattern on the side which has the aluminum face.

6. The method of claim 1 wherein the metal sheet is a composite metal sheet which has a copper face and a stainless steel face, said step of deforming the sheet to produce a blank being performed to provide the ornamental pattern on the side which has the copper face.

* * * * *